United States Patent
Mori

(10) Patent No.: US 8,705,125 B2
(45) Date of Patent: Apr. 22, 2014

(54) PRINTING SYSTEM AND PRINT SETTING PROPOSAL METHOD

(75) Inventor: Kazuo Mori, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 395 days.

(21) Appl. No.: 13/153,498

(22) Filed: Jun. 6, 2011

(65) Prior Publication Data

US 2011/0299106 A1 Dec. 8, 2011

(30) Foreign Application Priority Data

Jun. 7, 2010 (JP) ................................. 2010-130113

(51) Int. Cl.
*G06F 15/00* (2006.01)

(52) U.S. Cl.
USPC ........................................... 358/1.9; 358/1.15

(58) Field of Classification Search
USPC .................. 358/1.1, 1.9, 1.13, 1.15, 3.28
See application file for complete search history.

(56) References Cited

U.S. PATENT DOCUMENTS

| | | | |
|---|---|---|---|
| 7,190,467 B2 * | 3/2007 | Simpson et al. | 358/1.1 |
| 8,467,075 B2 * | 6/2013 | Takashima | 358/1.13 |
| 2005/0248800 A1 * | 11/2005 | Choi | 358/1.13 |
| 2009/0116063 A1 * | 5/2009 | Takashima | 358/1.15 |
| 2009/0303547 A1 | 12/2009 | Kurihara | |
| 2010/0238499 A1 * | 9/2010 | Wakui et al. | 358/1.15 |

FOREIGN PATENT DOCUMENTS

| | | | |
|---|---|---|---|
| JP | 2000-37933 A | | 2/2000 |
| JP | 2000-172469 A | | 6/2000 |
| JP | 2006053860 A | * | 2/2006 |
| JP | 2007-179508 A | | 7/2007 |
| JP | 2008-46865 A | | 2/2008 |

* cited by examiner

*Primary Examiner* — Kimberly A. Williams
(74) *Attorney, Agent, or Firm* — Birch, Stewart, Kolasch & Birch, LLP

(57) ABSTRACT

A recommendation set content in a print setting item is proposed based on a print setting history of a print job in which a print instruction is given from an information processing apparatus and printing is performed in an image forming apparatus at time of print setting in the information processing apparatus. A printing system accumulates set contents of print setting items at time of print instruction in the information processing apparatus as a print setting history, for example, in a server, and at start of print setting or at time of print setting change in the information processing apparatus, searches recommendation setting candidates based on a predetermined recommendation basis from the set contents of print setting items at the start of the print setting or at the time of the print setting change, and displays the searched recommendation setting candidates on the information processing apparatus.

13 Claims, 13 Drawing Sheets

FIG.4

| No. | PRINT SETTING ITEM 1 2up | PRINT SETTING ITEM 2 4up | PRINT SETTING ITEM 3 BOTH-SIDE | PRINT SETTING ITEM 4 MONOCHROME | PRINT FUNCTION OF PRINTING APPARATUS THAT IS OUTPUT DESTINATION | TYPE OF DOCUMENT FILE | USER |
|---|---|---|---|---|---|---|---|
| RECORD 1 | 1 | 0 | 1 | 1 | COLOR MACHINE | WORD PROCESSOR | A |
| RECORD 2 | 0 | 0 | 0 | 0 | COLOR MACHINE | SPREADSHEET | B |
| RECORD 3 | 0 | 1 | 1 | – | MONOCHROME MACHINE | PRESENTATION | C |
| | | | | | | | |
| RECORD N | 1 | 0 | 0 | 1 | | | X |

| SET ITEM | FREQUENCY | | | | |
|---|---|---|---|---|---|
| BOTH-SIDE | 2-UP/1000 TIMES | MONOCHROME/ 500 TIMES | 4-UP/300 TIMES | 6-UP/100 TIMES | 8-UP/50 TIMES |
| BOTH-SIDE/ 2up | MONOCHROME/ 300 TIMES | | | | |

FIG.7

| SET ITEM | RECOMMENDATION SETTING ITEM 1 | RECOMMENDATION SETTING ITEM 2 | RECOMMENDATION SETTING ITEM 3 |
|---|---|---|---|
| BOTH-SIDE | 2up | MONOCHROME | 4up |
| BOTH-SIDE/ 2-UP | MONOCHROME | | |

FIG.8

PROPERTY OF PRINTER A

MAIN | SHEET | ADVANCED SETTING | JOB HANDLING | WATERMARK | COLOR

USER SETTING(U): NOT REGISTERED  SAVE(V)...  RETURN TO STANDARD (F)

NUMBER OF COPY(I): 1

☑ PRINT IN COPY UNIT (L)

DOUBLE-SIDED PRINTING (Y)
○ SINGLE-SIDED PRINTING
● BOTH-SIDED PRINTING — HORIZONTAL-STITCHING
○ BOTH-SIDED PRINTING — VERTICAL-STITCHING
○ SADDLE STITCH PRINTING
SADDLE STITCH PRINTING (SAME MAGNIFICATION)

N-Up PRINTING (N): 1-Up
☐ BORDER (B)
ORDER (O): NO

OUTPUT
BINDING EDGE (G): LEFT
STAPLE (S): NO
☐ PUNCH (O)
☐ RELEASE OFFSET (E)
BINDING MARGIN (M): NO

PRINTING ORIENTATION (R)
● PORTRAIT
○ LANDSCAPE
☐ 180° ROTATED PRINT (1)

☐ MONOCHROME PRINTING (W)

OK   CANCEL   HELP

RECOMMENDATION PRINT SETTING 1. 2-UP
2. MONOCHROME PRINTING
3. 4-UP

PRINTING SYSTEM AND PRINT SETTING PROPOSAL METHOD

CROSS-NOTING PARAGRAPH

This non-provisional application claims priority under 35 U.S.C. §119(a) on Patent Application No. 2010-130113 filed in JAPAN on Jun. 7, 2010, the entire contents of which are hereby incorporated herein by reference.

FIELD OF THE INVENTION

The present invention relates to a printing system having a proposal function of a print setting and a print setting proposal method thereof.

BACKGROUND OF THE INVENTION

In recent years, since there are a wide variety of functions supported by a printer driver, a user who is unfamiliar with print processing, even in a case where there is a useful function, is not able to sufficiently use ability thereof because of not finding presence thereof, or not understanding a method for utilization thereof.

In order to solve such an issue, in Japanese Laid-Open Patent Publication No. 2008-46865, a method is proposed for acquiring attribute information of a document for each print job, presuming a print purpose from the acquired information and selecting an appropriate print mode.

However, in the method described in Japanese Laid-Open Patent Publication No. 2008-46865, since a print mode is selected based on the attribute information of the document, the print mode has been selected separately from a user who performs printing, print setting information set by the user and the like.

SUMMARY OF THE INVENTION

An object of the present invention is to provide a printing system capable of proposing a set content that is recommended in print setting items based on a print setting history concerning a print job in which a print instruction is given from an information processing apparatus and printing is performed in an image forming apparatus when a user performs a print setting in the information processing apparatus at the time of printing in the image forming apparatus, and a print setting proposal method thereof.

A first technical means of the present invention is a printing system provided with an image forming apparatus, and an information processing apparatus capable of giving a print instruction to the image forming apparatus, wherein the printing system accumulates set contents of print setting items at time of print instruction in the information processing apparatus as a print setting history, and at start of print setting or at time of print setting change in the information processing apparatus, searches recommendation setting candidates based on a predetermined recommendation basis from the set contents of the print setting items at the start of the print setting or at the time of the print setting change, and displays the searched recommendation setting candidates on the information processing apparatus.

A second technical means is the printing system as defined in the first technical means, wherein the printing system searches the recommendation setting candidates based on a recommendation basis such that a setting frequency of the set contents is greater than a predetermined order.

A third technical means is the printing system as defined in the second technical means, wherein the print setting history includes information concerning the information processing apparatus or a user of the information processing apparatus, and the printing system searches the recommendation setting candidates from the print setting histories that satisfy specific conditions concerning the information processing apparatus or the user of the information processing apparatus based on the recommendation basis such that the setting frequency of the set contents is greater than the predetermined order.

A fourth technical means is the printing system as defined in the second technical means, wherein a plurality of the image forming apparatuses are provided, the print setting history includes information concerning a model of the image forming apparatus, and the printing system searches the recommendation setting candidates from the print setting histories that satisfy specific conditions concerning a difference between models of the image forming apparatuses based on the recommendation basis such that the setting frequency of the set contents is greater than the predetermined order.

A fifth technical means is the printing system as defined in the second technical means, wherein the printing system displays the searched recommendation setting candidates on the information processing apparatus by arranging in descending order of the setting frequency.

A sixth technical means is the printing system as defined in the first technical means, wherein a plurality of the image forming apparatuses are provided, and the printing system searches candidates according to functions provided in the image forming apparatus that is an output destination as the recommendation setting candidates.

A seventh technical means is the printing system as defined in the first technical means, wherein the printing system searches candidates according to a type of a document file intended to output as the recommendation setting candidates.

An eighth technical means is the printing system as defined in the first technical means, wherein the print setting history includes information concerning the information processing apparatus or a user of the information processing apparatus, and the printing system does not execute a display of the recommendation setting candidates regarding at least the print setting items that have been set in the information processing apparatus, in a case where the searched recommendation setting candidates have been set in past times in the print setting items in the print setting history concerning the information processing apparatus displaying the recommendation setting candidates or the user of the information processing apparatus.

A ninth technical means is the printing system as defined in the first technical means, wherein the information processing apparatus accumulates the print setting items that have been set before in it as print setting items that have been set in past times, and does not execute a display of the recommendation setting candidates in a case where the recommendation setting candidates include the print setting items that have been set in past times, regarding at least the print setting items that have been set in past times.

A tenth technical means is the printing system as defined in the first technical means, wherein the printing system is provided with a print history management apparatus connected to the information processing apparatus via a network, and the print history management apparatus accumulates the print setting histories concerning a plurality of the information processing apparatuses, or concerning a user who uses any of the plurality of the information processing apparatuses.

An eleventh technical means is the printing system as defined in the first technical means, wherein the printing system is provided with one of the information processing apparatuses, and the information processing apparatus accumulates the print setting histories concerning a user who uses the information processing apparatus in a storage device provided inside the information processing apparatus.

A twelfth technical means is a print setting proposal method in a printing system provided with an image forming apparatus, and an information processing apparatus capable of giving a print instruction to the image forming apparatus, including: an accumulation step for accumulating set contents of print setting items at time of print instruction in the information processing apparatus as a print setting history; and a step for searching recommendation setting candidates based on a predetermined recommendation basis from the set contents of print setting items at start of print setting or at time of print setting change, and displaying the searched recommendation setting candidates on the information processing apparatus.

BRIEF DESCRIPTION OF THE DRAWINGS

FIG. 4 is a diagram showing an example of a print setting history table that is accumulated in the server in FIG. 1 and FIG. 2;

FIG. 6 is a diagram showing an example of a result extracted from the print setting history table of FIG. 4 by the search processing of FIG. 5;

FIG. 7 is a diagram showing an example of a result searched as information of recommendation candidates from the extracted result of FIG. 6 by the search processing of FIG. 5;

FIG. 8 is a diagram for describing an example of a method for displaying recommendation setting candidates on a print setting screen in the processing of FIG. 3;

PREFERRED EMBODIMENTS OF THE INVENTION

Figure 1:
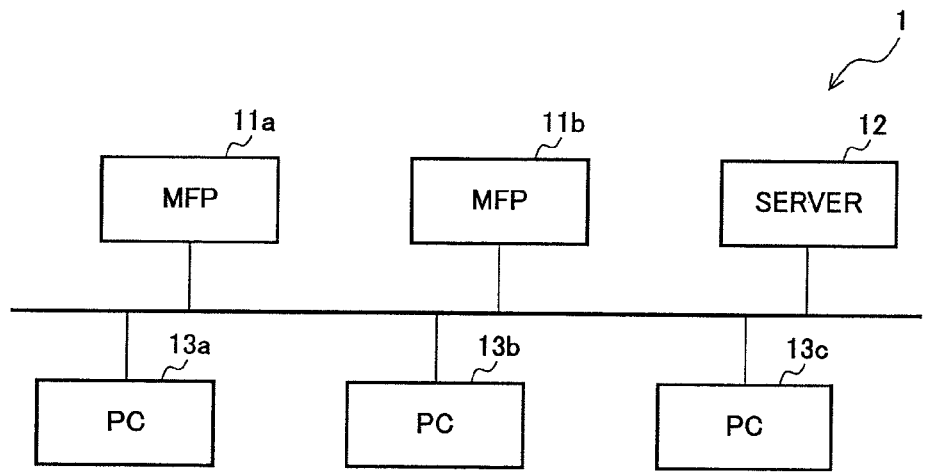
FIG. 1 is a diagram showing a configuration example of a printing system according to the present invention.

FIG. 1 is a diagram showing a configuration example of a printing system according to the present invention, and 1 denotes the printing system in the diagram. A printing system 1 illustrated in FIG. 1 is composed of multi-functional peripherals (MFPs) 11a and 11b as an example of an image forming apparatus, client PCs 13a to 13c as an example of an information processing apparatus and a server 12 as an example of a print history management apparatus which saves a print history, which are connected to each other with a network line. The print history includes at least a print setting history. Of course, the numbers of MFPs and client PCs that are connected to a network is not limited to those that are illustrated.

The client PCs 13a to 13c give a print instruction of a document file or the like to the server 12 by transmitting print data based on user operation. MFPs 11a and 11b are configured so as to be capable of performing printing on a print medium such as a recoding sheet according to the print instruction through the server 12. The MFPs 11a and 11b have a copy function, a facsimile function, a filing function and the like in addition to a print function. Note that, the image forming apparatus includes a single-function printer, facsimile apparatus and the like, in addition to the MFP. The server 12 passes the print instruction from the client PCs 13a to 13c to the MFPs 11a and 11b, as well as accumulates a history of print jobs (print history) printed by the MFPs 11a and 11b.

As described above, the PCs 13a to 13c may transmit the print instruction only to the server 12 so that the server 12 forwards the print instruction to the MFP 11a and the like, and such processing is assumed in the following description. However, each of the PCs 13a to 13c may give the print instruction in parallel directly to the server 12, MFG 11a and the like, and in this case, the server 12 only generates a print history including at least a print setting history from the print instruction, and does not request other devices to perform print processing itself or does not perform the print processing by itself. As an other processing example, the PCs 13a to 13c may transmit only a print setting to the server 12 to accumulate the print setting history in the server 12, and transmit print data itself directly to the MFP 11a and the like. In particular, when the server 12 is on the Internet (outside a local network including the PC 13a and the like), it is undesirable to place the print data outside the local network in consideration of security, and such processing is useful.

Figure 2:
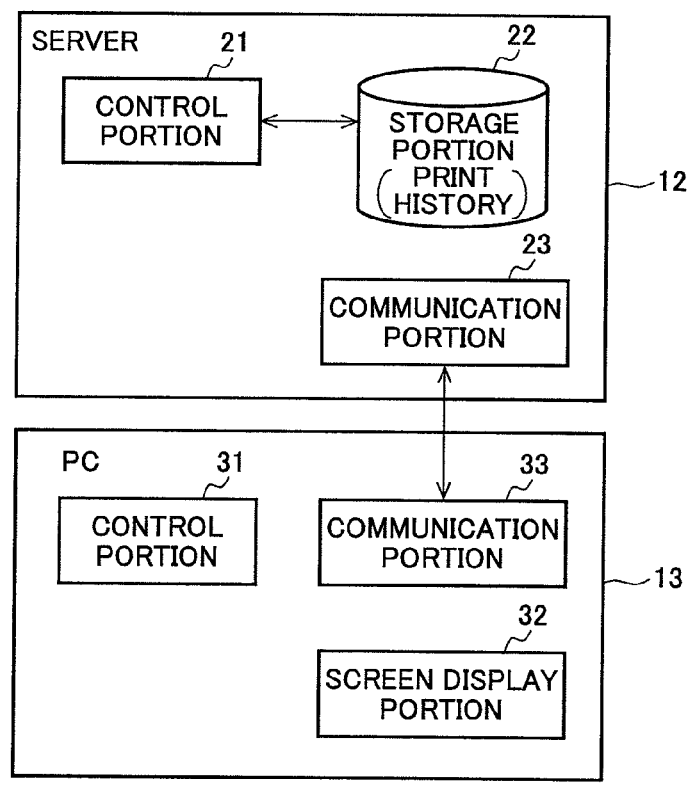
FIG. 2 is a block diagram showing a configuration example of a server and a PC in the printing system of FIG. 1.
Figure 12:
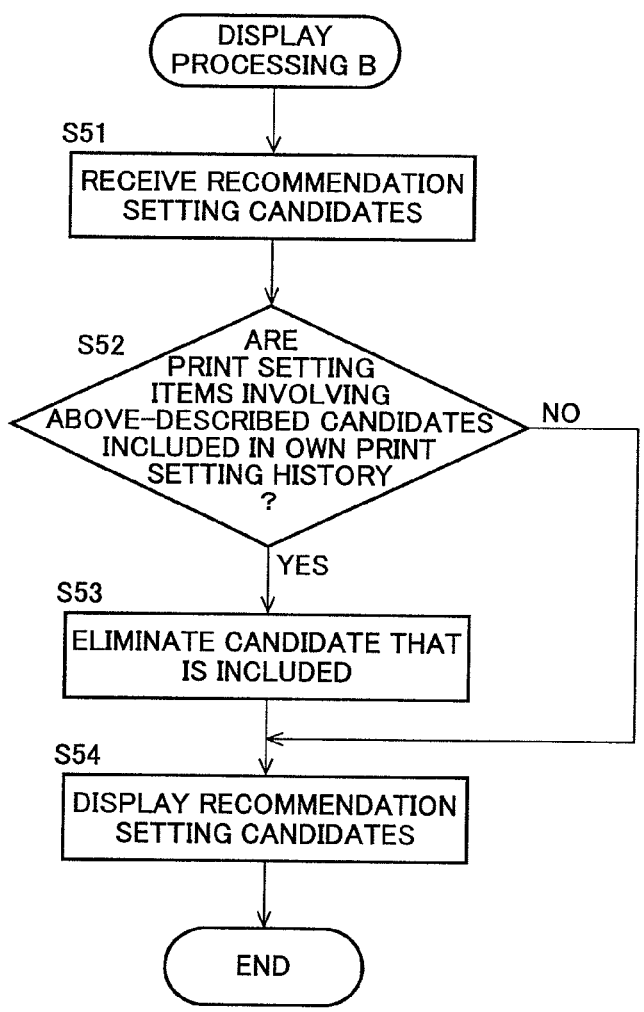
FIG. 12 is a flowchart for describing another example of reception/display processing in the processing of FIG. 3.

FIG. 2 is a block diagram showing a configuration example of a server and a PC in the printing system of FIGS. 1, and 12 denotes a server, and 13 denotes any of client PCs 13a to 13c in the diagram. The server 12 is provided with a control portion 21, a communication portion 23 and a storage portion 22 that stores a print history including at least a print setting history. Further, a client PC (hereinafter, simply referred to as PC) 13 is a general-purpose computer, and provided with a control portion 31, a screen display portion 32 and a communication portion 33. Note that, although there is no special description in the following, the control portion 21 controls the storage portion 22, the communication portion 23 and the like to execute the processing performed by the server 12, and the control portion 31 basically controls the screen display portion 32, the communication portion 33 and the like to execute the processing performed by the PC 13.

Figure 3:
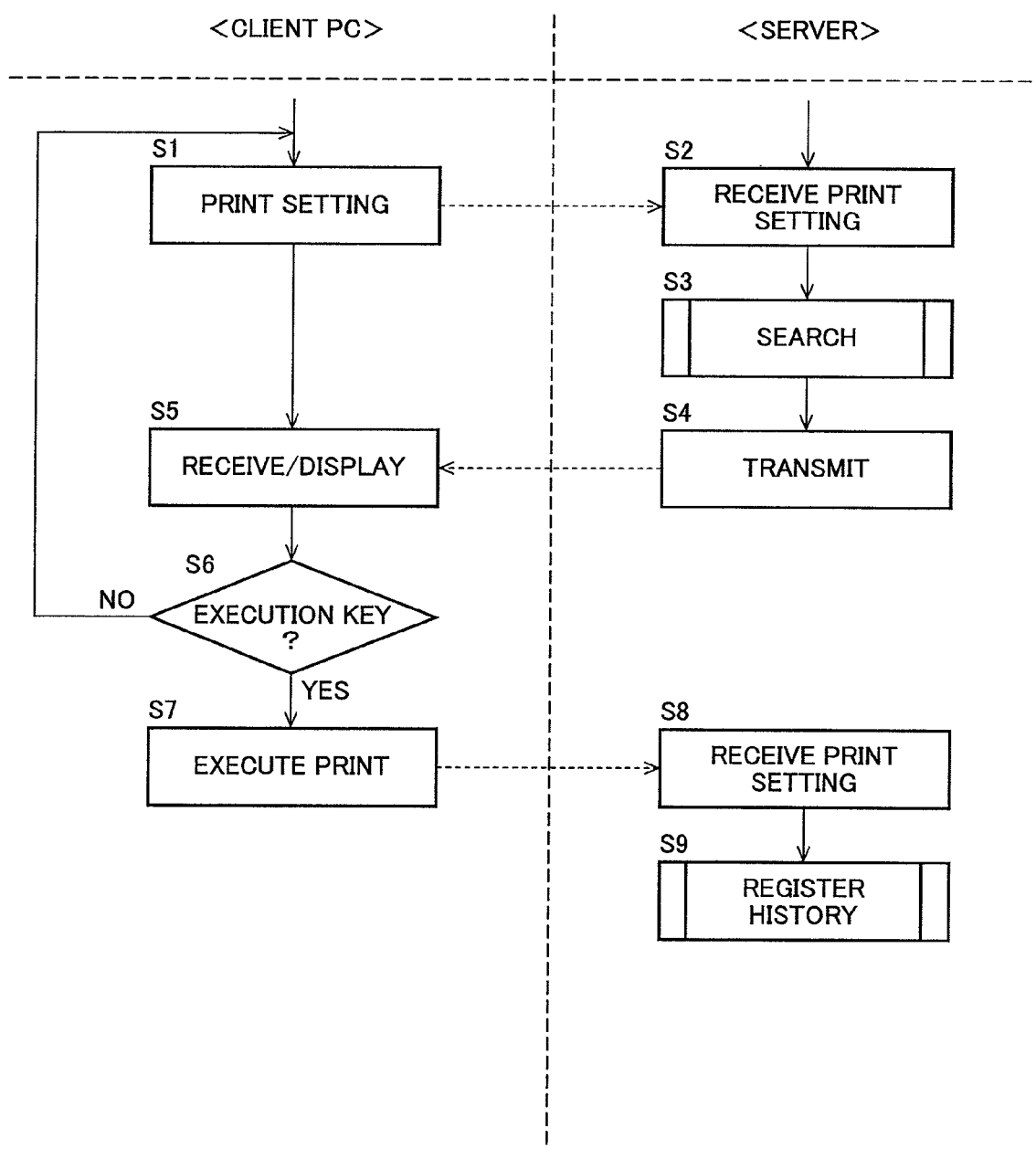
FIG. 3 is a flowchart for describing a processing example in the printing system of FIG. 1.

FIG. 3 is a flowchart for describing a processing example in the printing system of FIG. 1, and mainly shows processing between the server 12 and the PC 13 of FIG. 2. First, on the PC 13, for a document file that is opened with use of application software or an edited document file, a user activates (starts up) a printer driver by selecting a print button or the like, and displays a print setting screen on the screen display portion 32. The printer driver is triggered by the start-up of the print setting screen to transmit print setting information including a set content (basically a set content of default in this phase) in print setting items that are set on the print setting screen to the server 12 via the communication portion 33 (step S1). At step S1, even at the time other than the time of the start-up of the print setting screen, each time a user performs operation for changing the set contents of the print setting items during a display of the print setting screen, the print setting information is transmitted to the server 12. However, at this time, it is simply needed just to transmit information only concerning the print setting items whose set contents are changed.

Here, for example, the print setting items include a single-side/both-side setting item, an aggregate printing setting item, a color/monochrome setting item and the like, and the set contents corresponding thereto, respectively, includes single-sided printing and both-sided printing, 1-up, 2-up (also referred to as 2 in 1), 4-up (also referred to as 4 in 1) and the like, color printing and monochrome printing. Additionally, for example, it is also possible to consolidate combinations of respective items of single-sided/both-sided and aggregation printing so as to be able to be handled as one print setting item, or the like. As a further other method, each of the print setting items may be handled separately like a single-sided print setting item, a both-sided print setting item, a 1-up setting item, a 2-up setting item, a 4-up setting item, a color printing setting item and a monochrome printing setting item, and each set content may be set to either of execution or inexecution.

The server 12 searches, when receiving print setting information (step S2), recommendation setting candidates from a print setting history (that is, information of which print execution has already been performed) of the storage portion 22, based on set contents of the print setting items included in the print setting information transmitted by the PC 13 at the time of change of the set content (as a search key) (step S3). The recommendation setting candidates to be searched may include only information of the set content in which an other PC has executed in past times, or also include information of the set content in which the PC 13 itself has executed in past times in addition thereto. The server 12 then returns the searched recommendation setting candidates to the PC 13 (step S4). Here, in order to transmit the recommendation setting candidates, in the above-described search, search is performed for not only set contents of print setting items which coincide with a search key but also for set contents of print setting items to be recommended based on a predetermined recommendation basis such that, for example, a certain user (skilled user) uses, or the like, as described below, among the set contents in the print setting items included in the print setting history.

The PC 13 displays the recommendation setting candidates returned from the server 12 on the screen display portion 32 (step S5) so that a print setting proposal is performed for a user. At step S5, it is preferred to distinctly display the recommendation setting candidates for the user.

Next, the PC 13 determines whether or not a print instruction is given by pressing a print execution key (step S6), and in the case of NO, returns the process to step S1, receives the selection operation for changing set contents of print setting items from the user in a state where the recommendation setting candidates are displayed, and transmits the print setting information including the set contents that the selection operation indicates. Note that, when the PC 13 transmits the print setting information once in a state where the recommendation setting candidates are displayed, the server 12 that received the print setting information may be configured not to perform search and transmission of the recommendation setting candidates. Namely, the server 12 may perform search and transmission of the recommendation setting candidates only once before the print instruction is performed. Further, search and transmission may be executed only once for each print setting item.

On the other hand, in the case of YES at step S6, that is, in a case where the print execution key is pressed, a printer driver of the PC 13 generates print data from a content of the print instruction (set content in a document file intended for printing or print setting information) to transmit to the server 12 (step S7). At step S7, in a case where the print setting information at the time of the print instruction is not transmitted at step S1, the print setting information at the time of print instruction (that is, last print setting information) is also transmitted. The server 12 receives the print instruction with the print data, as well as receives the print setting information at the time of the print instruction (step S8).

Subsequently, the server 12 registers the print setting information as a print setting history for search of recommendation setting candidates in other print setting processing (step S9). At step S9, when transmission of the print setting information has already been completed at step S1 and transmission of the print setting information is not performed at step S7, it is judged by receiving the print instruction that the print setting information that has already been received is a decided one, which may be formally registered as the print setting history. In this manner, the server 12 records print setting items included in the print setting information while updating them according to a change of set contents, and accumulates the set contents in the print setting items that are recorded at the time of the print instruction in the storage portion 22 as the print setting history. However, without limiting to such record while updating, the server 12 may be able to accumulate the set contents in the print setting items at the time of the print instruction as the print setting history, for example, by recording only at the time of the print instruction, or the like.

In this manner, according to the present invention, when a user performs a print setting in the PC 13 when printing is performed by the MFP 11a or the like, it is possible to propose set contents that are recommended in the print setting items in a user interface based on a print setting history concerning a print job in which print instructions are given from a plurality of PCs (a PC which performs the print setting may be included) to be executed in the MFP 11a or the like. In this proposal, since a past print setting history of an other user is used in order to decide print settings to be recommended, all users are able to utilize useful print settings held by a specific user. Namely, according to the present invention, the user is able to acquire a printing method for further effectively performing current printing. Moreover, the server 12 is described on the assumption that it accumulates the print setting history for a plurality of the PCs 13 and each of the PCs 13 corresponds to each of users, however, the server 12 may accumulate concerning users who use any of the plurality of PCs 13, and the print setting history may be managed based on information of a user account indicating the user, or the like.

Figure 5:
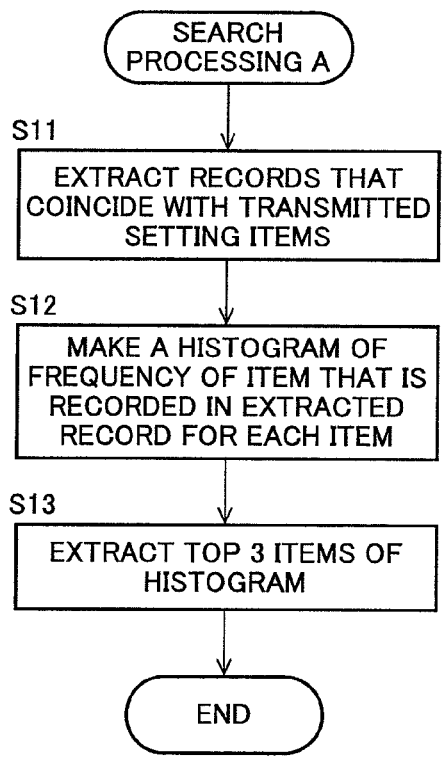
FIG. 5 is a flowchart for describing an example of search processing in the processing of FIG. 3.

Next, description will be given for a further preferable data form of a print setting history, a recommendation setting candidate and the like will be described with some examples with reference to FIG. 4 to FIG. 7. FIG. 4 is a diagram showing an example of a print setting history table that is accumulated in a server in FIG. 1 and FIG. 2, and 40 denotes a print setting history table in the diagram. Further, FIG. 5 is a flowchart for describing an example of search processing in the processing of FIG. 3, FIG. 6 is a diagram showing an example of a result extracted from the print setting history table of FIG. 4 by the search processing of FIG. 5 and FIG. 7 is a diagram showing an example of a result searched as information of recommendation candidates from the extracted result of FIG. 6 by the search processing of FIG. 5.

A print setting history table 40 is stored in the storage portion 22, and set contents of all print setting items concerning the executed print job are accumulated in the table 40 as one record each time the PC 13 executes printing once. In the print setting history table 40, recording is performed for 2-up as a print setting item 1, 4-up as a print setting item 2, both-sided printing as a print setting item 3 and monochrome printing as a print setting item 4, and set contents are indicated as "1" in the case when respective items are executed, and as "0" in the case when they are not executed. The print setting items indicate the print setting items that were stored in the server 12 immediately before an instruction of print execution is given from the PC 13 as described above.

Further, in the print setting history table 40, as a further preferable example, information indicating a print function in an MFP as an output destination from the PC 13 (for example, information indicating whether it is a color machine or a monochrome machine), information indicating a type of a printed document file and information of a user are acquired from the PC 13 to be stored. The information of the user is usable for searching the above-described certain user, and may be an IP address of the PC 13 that is used.

The above-described server 12 preferably searches (extracts) recommendation setting candidates based on a recommendation basis such that a setting frequency of set contents in print setting items is higher than a predetermined order. Regarding the setting frequency, tabulation may be performed for each set content each time a print setting history is recorded (that is, at the time of print instruction) to accumulate the print setting history as the setting frequency of each set content, and tabulation for each set content may be performed at the time of search to obtain the setting frequency of each set content. Additionally, as the predetermined order, for example, first place or third place may be allowed, and it may be allowed to set the predetermined order itself. That is, concerning the setting frequency, the set contents in the print setting items may be accumulated so that the setting frequency may be obtained at least at the time of search. In any event, the searched recommendation setting candidates are received and displayed in the PC 13. Further, it is preferred to return to the PC 13 by arranging in descending order of the setting frequency, or to return to the PC 13 by adding information of the setting frequency itself or the order of the setting frequency, thereby displaying the returned candidate in descending order of the setting frequency in the PC 13.

In description of an example of the processing, at step S3 in FIG. 3, as shown in FIG. 5, the server 12 first extracts a record that coincides with a print setting item transmitted from the PC 13 from the print setting history table 40 (step S11). For example, when "both-side" is designated in a print setting of printing for which a user next attempts to execute, information containing "both-side" is transmitted from the PC 13 to the server 12. The server 12 extracts a record that is set to "both-side" from among records of print setting histories. In an example of the print setting history table 40, a record 1 and a record 3 are set to the both-side, and these two records are thus extracted.

Next, the server 12 makes a histogram of a frequency of a print setting item in which "having been executed" is recorded in the extracted record (that is, a frequency of a print setting item in which a set content is indicated as "1") for each print setting item (step S12). In the case of the records 1 and 3, frequencies of items of 2-up, 4-up and monochrome are counted up by 1, respectively. That is, in the case of the records 1 and 3, concerning each of "2-up", "4-up" and "monochrome" of the print setting items, each of the frequencies in which the set content "having been executed" is counted up by 1. In this way, for all the extracted records, the print setting item that is set (that is, a print setting item that is recorded to "having been executed") is counted up and represented in a histogram. In an extraction result 60 illustrated in FIG. 6, an example of a count result in a case where information containing "both-side" is transmitted from the PC 13 is shown in an upper stage thereof, and an example of a count result in a case where information containing "both-side and 2-up" is transmitted from the PC 13 is shown in a lower stage thereof.

Subsequently, the server 12 extracts top three items of the histogram, which are served as recommendation setting candidates (step S13). At step S5 in FIG. 3, the PC 13 may then display the recommendation setting candidates which are arranged in descending order of frequencies. As a result, information in the upper stage and the lower stage among recommendation setting candidates 70 illustrated in FIG. 7 is displayed on a print setting screen of the PC 13 in order of a setting frequency. That is, corresponding to the upper stage of the extraction result 60 of FIG. 6, a recommendation setting item 1 (2-up and monochrome printing), a recommendation setting item 2 (monochrome printing) and a recommendation setting item 3 (4-up), are displayed in this order. Further, corresponding to the lower stage of the extraction result 60 of FIG. 6, the recommendation setting item 1 (monochrome printing) is displayed. This is an example in a case where only one top extraction result is present.

Next, an example is given for a print setting screen including recommendation setting candidates. FIG. 8 is a diagram for describing an example of a method for displaying recommendation setting candidates on a print setting screen in the processing of FIG. 3. On a print setting screen 100 in the PC 13 illustrated in FIG. 8, a box 102 having menu buttons in addition to a normal print setting screen 101 is displayed. The box 102 may be incorporated into the print setting screen 101.

The box 102 is a box for displaying the recommendation setting candidates, and in this example, menu buttons 104*a* to 104*c* that are top three setting items are displayed together with titles 103 thereof as the recommendation setting items. In this example, a display example is given for the case of a search result in the upper stage in the recommendation setting candidates 70 of FIG. 7. In such a display state, in a case where a user desires to perform any setting among the recommendation setting candidates, when a menu button corresponding thereto is pressed, setting thereof is reflected. Additionally, this example is a display example in a case where the set content is classified by executed/unexecuted, namely, 1/0, however, for each of the print setting items, it is also possible to display a recommendation setting candidate (candidate of a recommendation set content).

Figure 9:
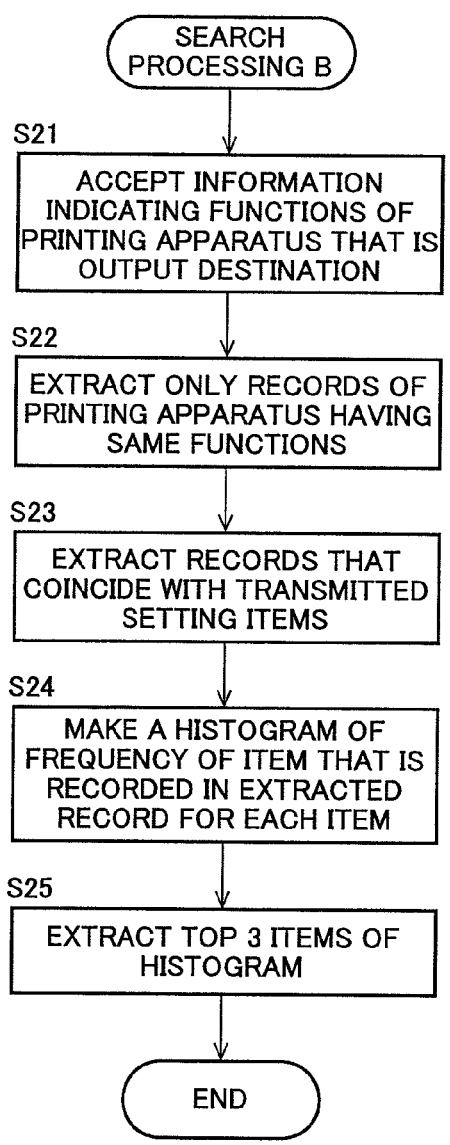
FIG. 9 is a flowchart for describing another example of the search processing in the processing of FIG. 3.

Next, another example of search processing will be described with reference to FIG. 9. FIG. 9 is a flowchart for describing another example of the search processing in the processing of FIG. 3. In this example, the server 12 searches and transmits, as recommendation setting candidates, candidates corresponding to functions provided in an MFP, a printing apparatus or the like at an output destination. The PC 13 comes to display the recommendation setting candidates. For example, there is no point to recommend a user who attempts to perform output to a monochrome machine for a monochrome function, however, with this form, it is possible to notify the user of recommendation setting information that is suitable for such a use status. However, a plurality of MFPs and the like are needed to be connected to each other as illustrated in such a form in which search is performed. Moreover, this form is able to be used in combination with a form that replies by arranging in descending order of a setting frequency to display on the PC 13, or the like.

An example will be described which the recommendation setting candidates are changed according to functions of an MFP that is an output destination (example corresponding to functions of an MFP). At step S3 in FIG. 3, the server 12 first receives from the PC 13 information indicating functions of an MFP that is an output destination (step S21). Next, the server 12 extracts only records of the MFP having the same functions from among records of a print setting history (step S22). For example, in a case where the PC 13 attempts to give an instruction of output to a monochrome machine, when the PC 13 transmits information indicating monochrome functions, the server 12 extracts only records of the "monochrome machine" among "print functions of a printing apparatus as an output destination" from among records of the print setting history. Thereafter, from among the extracted records, processing at the above-described steps S11 to S13 is performed (steps S23 to S25).

Figure 10:
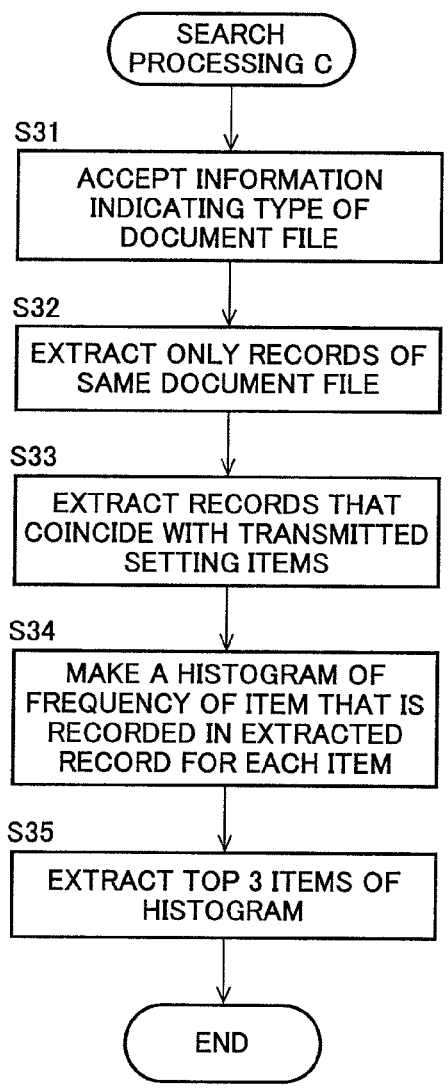
FIG. 10 is a flowchart for describing another example of the search processing in the processing of FIG. 3.

Next, a still another example of search processing will be described with reference to FIG. 10. FIG. 10 is a flowchart for describing another example of the search processing in the processing of FIG. 3. In this example, the server 12 searches and transmits candidates according to a type of a document file intended for output as recommendation setting candidates. The PC 13 comes to display the recommendation setting candidates. For example, since there is a possible example such that there is high use of 2-up in a word processing document and there is high use of 4-up in the case of presentation data, this form makes it possible to notify a user of recommendation setting information that is suitable for such a use status. Further, this form is able to be used in combination with a form in which candidates according to functions provided in an MFP as an output destination are searched, a form in which a reply is sent by arranging in descending order of a setting frequency to display on the PC 13, or the like.

An example will be described which recommendation setting candidates are changed according to a type of a document file intended for output (example corresponding to a document file). At step S3 in FIG. 3, the server 12 first receives information indicating a type of a document file from the PC 13 (step S31). Next, the server 12 extracts only records of the same document files from among records of a print setting history (step S32). Thereafter, from among the extracted records, processing at the above-described steps S11 to S13 is performed (steps S33 to S35).

Figure 11:
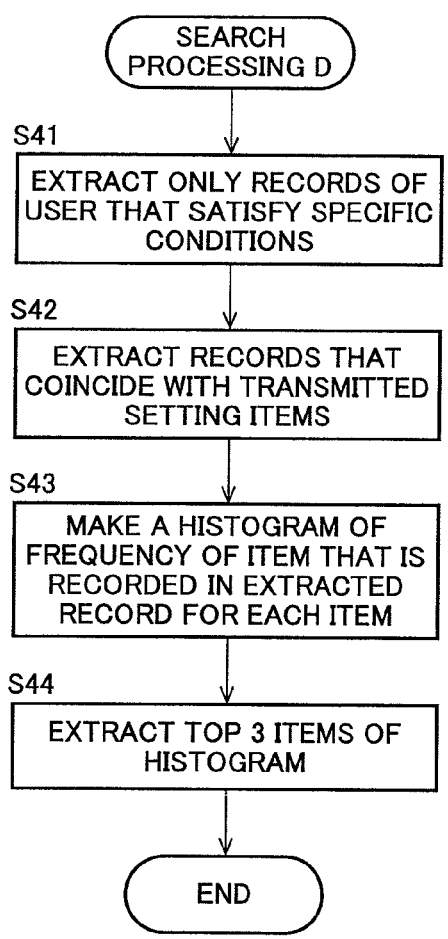
FIG. 11 is a diagram for describing another example of the search processing in the processing of FIG. 3.

Next, a still another example of search processing will be described with reference to FIG. 11. FIG. 11 is a flowchart for describing another example of the search processing in the processing of FIG. 3. In this example, the server 12 searches and transmits recommendation setting candidates from print setting histories that satisfy specific conditions concerning the PC 13 or a user of the PC 13 based on a recommendation basis such that a setting frequency of a set content is greater than a predetermined order. However, the print setting histories should include information concerning the PC 13 or information concerning the user of the PC 13. Of course, as an accumulation form, the print setting histories are also able to be accumulated for each information concerning the PC 13 (namely, for each PC 13), or for each information concerning the user of the PC 13 (namely, for each user). Furthermore, the setting frequency may be calculated at the time of record of the print setting histories, or calculated at the time of search.

Specific conditions here include, for example, a skilled user (user) who has history of usage of 2 years or more, a user who works for 2 years or more and less than 30 years after entering a company, a specific PC in which a print setting that is often used in a company is set, a PC that is used at a specific department in a company, and the like. It is possible to specify a user by a user account or a user name, and a PC by an IP address, a machine number or the like. Specifically, as items of the print setting history table 40 of FIG. 4, information indicating PC attribute (code indicating a his/her department or the like), an IP address of a PC, a user and the like are stored together. A recommended one, at the time of extraction, is then subjected to filtering with a specific PC attribute, a user name and the like, and is extracted therefrom. The PC 13 comes to display the recommendation setting candidates based on such specific conditions. Further, this form is able to be used in combination with a form in which candidates according to functions provided in an MFP that is an output destination are searched, a form in which candidates according to a type of a document file intended for output are searched, a form in which a reply is sent by arranging in descending order of a setting frequency to display on the PC 13, or the like.

An example will be described which candidates that satisfy such specific conditions are displayed. At step S3 in FIG. 3, the server 12 first extracts only records of users (or PCs) that satisfy specific conditions from among records of print setting histories (step S41). Thereafter, from among the extracted records, the above-described processing at steps S11 to S13 is performed (steps S42 to S44). Such processing makes it possible to perform a most suitable recommendation display according to specific conditions concerning users (or PCs).

Next, a still another example of search processing will be described. In this example, the server 12 searches and transmits recommendation setting candidates from print setting histories that satisfy specific conditions concerning a difference between models of the MFP 11a and the like based on a recommendation basis such that a setting frequency of a set content is greater than a predetermined order. However, a plurality of image forming apparatuses such as the MFP 11a are provided in a system, and the print setting histories should include information concerning a difference between models of the image forming apparatuses. Of course, as an accumulation form, it is also possible to accumulate the print setting histories for each information concerning a difference between models of MFPs. Further, the setting frequency may be calculated at the time of record of the print setting histories, or calculated at the time of search.

Specific conditions here include, for example, a model having a color print function, a model having a monochrome print function for x sheets or more per minute, a predetermined model after a released year and the like. It is possible to specify the MFP 11a or the like by a model number and the like. Specifically, as items of the print setting history table 40 of FIG. 4, information indicating attribute such as the MFP 11a or the like (for example, a predetermined digit of a model number) and the like are stored together. A recommended one is extracted by filtering candidates by means of a specific MFP attribute and the like. The PC 13 comes to display the recommendation setting candidates based on such specific conditions. Additionally, this form does not need to be used in combination with a form other than a form in which candidates according to functions provided in an MFP as an output destination (for example, MFP 11a) are searched, but is also able to be used in combination with other forms including a form in which candidates according to a type of a document file intended for output are searched, a form in which a reply is sent by arranging in descending order of a setting frequency to be displayed on the PC 13, a form that performs search based on specific conditions concerning PCs or users, or the like.

In an example in which candidates that satisfy such specific conditions are displayed, at step S41 of FIG. 11, the server 12 merely extracts only records of an MFP that satisfy the specific conditions from among records of print setting histories, and performs other processing likewise. Although there is a difference between models to be used due to a difference between models of the MFP 11a and the like, such processing makes it possible to perform most suitable recommendation display according to specific conditions concerning the models of the MFP 11a and the like.

Next, an example of display processing that is different from reception/display processing at step S5 of FIG. 3 (hereinafter, referred to as display processing A) will be described with reference to FIG. 12. FIG. 12 is a flowchart for describing another example of reception/display processing in the processing of FIG. 3. Processing to be described here is referred to display processing B because of being different from the display processing A. The display processing B to be described here is alternate processing of the display processing A, and is able to be applied to the above-described other various forms likewise.

In the display processing B, print setting items for which a user has set in past times are recorded (set content thereof may not be recorded), and after recommendation setting candidates are extracted, in a case where there is a record of the print setting item that has been set in past times from among the extracted candidates, recommendation display concerning candidates of a set content of the print setting item is prohibited.

In a printing system, in a case where the searched recommendation setting candidates have been set in past times in print setting items in a print setting history concerning the PC 13 that displays the recommendation setting candidates or a user of the PC 13, regarding at least a print setting item that has been set in the PC 13, display of the recommendation setting candidate is not executed. However, in this processing example, the print setting history should include information concerning the PC 13 or a user of the PC 13 as illustrated. Processing may be employed such that all recommendation setting candidates are not displayed, that is, none of recommendation display is performed.

Alternatively, a print setting item that was set before in PC 13 is accumulated in it as a print setting item that has been set in past times, and the following restriction may be performed. That is, such restriction is provided that in a case where the recommendation setting candidates include the print setting item that has been set in past times, regarding at least a print setting item that has been set in past times, display of the recommendation setting candidates is not executed. Also in this processing, processing may be employed such that all recommendation setting candidates are not displayed, that is, none of recommendation display is performed.

When the PC 13 first receives recommendation setting candidates by any processing (step S51), the PC 13 determines whether or not a print setting item involving the candidate is included in own print setting histories (step S52). Note that, processing may be also employed that display is not prohibited in a case where a candidate itself has not been set, and in such a case, at step S52, the candidate may be determined whether or not to be included during each print setting in the own print setting histories. In the case of YES at step S52, the PC 13 eliminates a candidate that is determined to be included therein from the recommendation setting candidates (step S53), and the recommendation setting candidates are displayed (step S54). On the other hand, in the case of NO at step S52, the PC 13 does not perform elimination processing and directly performs processing at step S54.

In this way, in the case of a print setting item that has been set once, a user has already understood the print setting item, and display is thus prohibited by judging that there is no need to recommend again so that it is possible to prevent what a user feels as a bother concerning recommendation display. However, it is preferred to further acquire such an effect that a default setting is excluded as a print setting item that has been set in past times. Here, since a set content of each print setting item is able to be corresponded to a function of the MFP 11a or the like, it is possible not to perform recommendation display concerning the functions in the case of having functions that has been set in past times.

Figure 13:
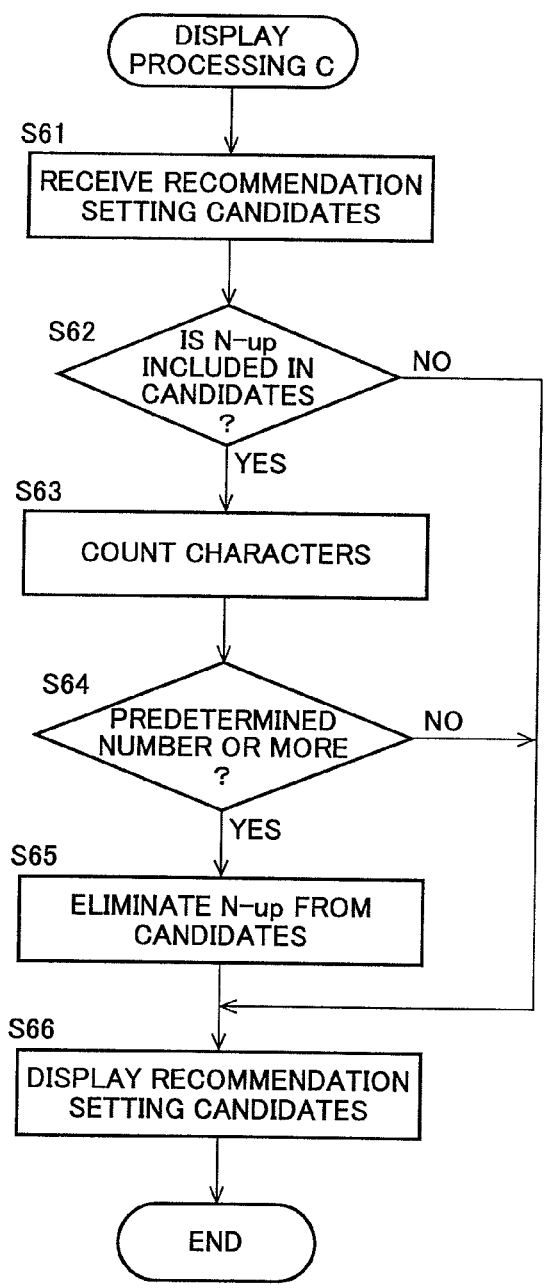
FIG. 13 is a flowchart for describing another example of the reception/display processing in the processing of FIG. 3.

Next, an example of display processing that is different from the display processing A and B will be described with reference to FIG. 13. FIG. 13 is a flowchart for describing another example of the reception/display processing in the processing of FIG. 3. Processing to be described here is referred to display processing C. The display processing C to be described here is alternative processing of the display processing A and the display processing B, and is able to be applied to the above-described other various forms likewise.

In the display processing C, the number of characters of print data is detected, and N-up is prohibited to be displayed as a recommended one in the case of a large number of characters. The PC 13 determines, when first receiving recommendation setting candidates (step S61), whether or not N-up is included in the received recommendation setting candidates (step S62). In the case of YES at step S62, the PC 13 counts characters (step S63), determines whether or not the counted value is a predetermined number or more (step S64), eliminates a candidate of N-up from the recommendation setting candidates only in the case of the predetermined number or more (step S65) and displays the recommendation setting candidates (step S66). On the other hand, in the case of NO at step S62 and NO at step S64, the PC 13 directly performs processing at step S66 without performing elimination processing.

In this way, in the display processing C, after N-up is extracted as a recommendation setting candidate, the server 12 acquires the number of characters in a file that is attempted to be printed through a driver from an application via an operation system, and when the acquired number of characters is larger than a predetermined number of characters, N-up is prohibited to be displayed as a recommended one so that it is possible to prevent from being difficult to view the characters to be reduced with N-up. Characters are inevitably reduced in the case of a large number of characters, and such processing may be thus performed since a document having a large number of characters is not suitable for N-up. Note that, there may be a case of having small characters and a small number of characters, however, there is a large number of blanks even in the case of performing N-up in such a case, and it is thus not difficult to view compared to a document with a large number of characters.

Further, as another display example of recommendation settings, in the case of printing a plurality of copies, a staple setting may be recommended, regardless of print setting histories.

In a printing system in each form described based on FIG. 1 as described above, in order to accumulate print setting histories, the printing system is provided with a print history management apparatus connected to an information processing apparatus via a network, and assumed that the print setting histories are accumulated concerning a plurality of information processing apparatuses, or the print setting histories are accumulated concerning a user who uses any of these plurality of information processing apparatuses.

Figure 14:
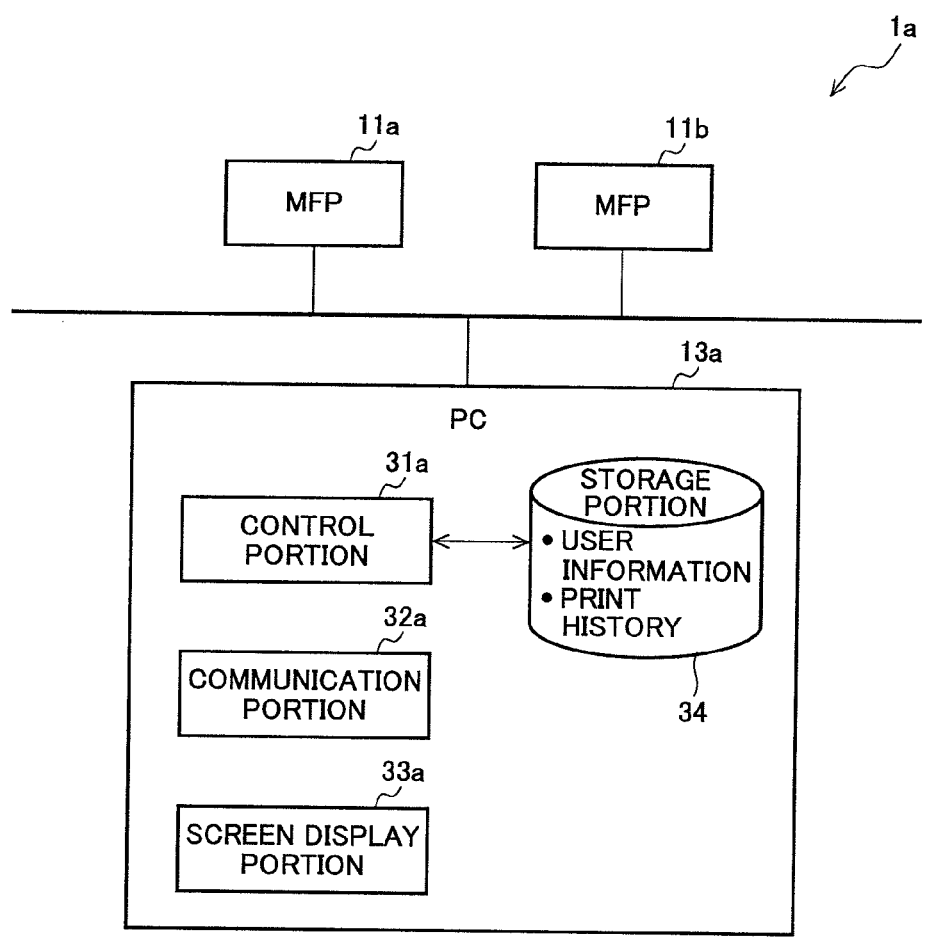
FIG. 14 is a diagram showing another configuration example of the printing system according to the present invention.

On the other hand, in the present invention, it is also possible to configure that the information processing apparatus has an internal storage device in order to accumulate print setting histories. In the case of this configuration, a printing system may accumulate the print setting histories concerning a plurality of users who use one information processing apparatus. Such a configuration example will be described with reference to FIG. 14. FIG. 14 is a diagram showing another configuration example of a printing system according to the present invention. In an example to be described here, the above-described various forms are able to be employed basically, however, there is a specific difference that communication via the server 12 disappears.

A printing system 1a illustrated in FIG. 14 is composed of multi-functional peripherals (MFPs) 11a and 11b as an example of an image forming apparatus and one PC 13a as an example of one information processing apparatus, which are connected to each other with a network line. Of course, the number of MFPs connected to a network is not limited to that of what is illustrated, and data may be allowed that a print setting history is separated between individual PCs even though the same PC as the PC 13a is connected to the same network. The PC 13a accumulates the print setting history concerning a user who uses the PC 13a in a storage device provided inside the PC 13a. Here, it is preferred to accumulate a print history for each user, and in a form using the above-described own print setting histories, user information (for example, information indicating print setting items that have been set in past times for each user account) may be recorded separately from the print setting histories.

In this way, print setting histories concerning a plurality of user accounts are accumulated, and for example, a recommendation basis may be such that a setting frequency (use frequency for each setting item) is greater than a predetermined order. Namely, from a result of a cumulative total of use frequencies for each setting item for each of a plurality of user accounts in one PC 13a, it is configured that a setting in which a use frequency is great is extracted as a recommended one. This configuration makes it possible to recommend, in a case where a plurality of users use one PC 13a, a set content and a function in which use frequencies are great in the PC 13a so as to recommend a set content and a function suitable for an actual use state.

Specifically, a setting history R of a printer driver operated under the authority of a general user is stored inside the printer drive for each user. Print setting tables R1, R2, etc. are stored for each user. Subsequently, when the PC 13a is logged in under the authority of an administrator, setting frequencies of the print setting history tables R1, R2, etc. are counted to create a histogram H, which is stored as information capable of being accessed under the authority of general users. Hereinafter, when a print setting is performed under the authority of general users, recommendation setting candidates are displayed with reference to the histogram H. This makes it possible to perform recommendation display without providing a server outside.

In this way, even when only one PC 13 is connected to a printing system, it is possible to acquire the same effect as that of a system described in FIG. 1 and the like in the case of an environment where a plurality of users are able to use. Further, even in a case where only one PC 13 is connected to the printing system and only one user uses, it is possible to accept a proposal of a recommended candidate from statistics of an own set content, it is thus useful in some of forms.

In this way, the printing system of the present invention is able to employ a configuration example of FIG. 1, a configuration example of FIG. 14 and the like. That is, the printing system according to the present invention is provided with an image forming apparatus and an information processing apparatus capable of giving a print instruction to the image forming apparatus. This printing system then accumulates, as a print setting history, set contents of print setting items at the time of print instruction in the information processing apparatus, and at the start of print setting or at the time of print setting change in the information processing apparatus, searches recommendation setting candidates based on a predetermined recommendation basis on the basis of the set contents of the print setting items at the start of the print setting or at the time of the print setting change, and displays the searched recommendation setting candidates on the information processing apparatus.

The printing system according to the present invention as described above was described, however, as describing a flow of processing, the present invention may also employ a form as a print setting proposal method in this printing system. This print setting proposal method includes, (1) an accumulation step of accumulating set contents of print setting items at the time of print instruction in an information processing apparatus as a print setting history, and (2) a step of searching recommendation setting candidates based on a predetermined recommendation basis on the basis of set contents of print setting items at the start of print setting or at the time of print setting change, and displaying the searched recommendation setting candidates in the information processing apparatus. Other application examples are just like description about the printing system, which description is omitted. Moreover, the print setting proposal method is able to be achieved by being incorporated as a program in the above-described PC for a system without using a server, and on the other hand, incorporated as a program for each apparatus in each of the above-described PC and server for a system using a server.

According to the present invention, provided are a printing system capable of proposing a set content to be recommended in a print setting item based on a print setting history concerning a print job in which a print instruction is given from an information processing apparatus to be printed in an image forming apparatus when a user performs a print setting in the information processing apparatus at the time of printing with the image forming apparatus, and a print setting proposal method thereof.

The invention claimed is:

1. A printing system provided with an image forming apparatus, and an information processing apparatus capable of giving a print instruction to the image forming apparatus, wherein the printing system accumulates set contents of print setting items at time of print instruction in the information processing apparatus as a print setting history, and at start of print setting or at time of print setting change in the information processing apparatus, searches recommendation setting candidates based on a predetermined recommendation basis from the set contents of the print setting items at the start of the print setting or at the time of the print setting change, and displays the searched recommendation setting candidates on the information processing apparatus, wherein the information processing apparatus accumulates the print setting items that have been set before in it as print setting items that have been set in past times, and does not execute a display of the recommendation setting candidates in a case where the recommendation setting candidates include the print setting items that have been set in past times, regarding at least the print setting items that have been set in past times.

2. The printing system as defined in claim 1, wherein
the printing system searches the recommendation setting candidates based on a recommendation basis such that a setting frequency of the set contents is greater than a predetermined order.

3. The printing system as defined in claim 2, wherein
the print setting history includes information concerning the information processing apparatus or a user of the information processing apparatus, and
the printing system searches the recommendation setting candidates from the print setting histories that satisfy specific conditions concerning the information processing apparatus or the user of the information processing apparatus based on the recommendation basis such that the setting frequency of the set contents is greater than the predetermined order.

4. A printing system provided with an image forming apparatus, and an information processing apparatus capable of giving a print instruction to the image forming apparatus, wherein
the printing system accumulates set contents of print setting items at time of print instruction in the information processing apparatus as a print setting history, and at start of print setting or at time of print setting change in the information processing apparatus, searches recommendation setting candidates based on a predetermined recommendation basis from the set contents of the print setting items at the start of the print setting or at the time of the print setting change, and displays the searched recommendation setting candidates on the information processing apparatus, wherein
the printing system searches the recommendation setting candidates based on a recommendation basis such that a setting frequency of the set contents is greater than a predetermined order, wherein
a plurality of the image forming apparatuses are provided,
the print setting history includes information concerning a model of the image forming apparatus, and
the printing system searches the recommendation setting candidates from the print setting histories that satisfy specific conditions concerning a difference between models of the image forming apparatuses based on the recommendation basis such that the setting frequency of the set contents is greater than the predetermined order.

5. The printing system as defined in claim 2, wherein
the printing system displays the searched recommendation setting candidates on the information processing apparatus by arranging in descending order of the setting frequency.

6. The printing system as defined in claim 1, wherein
a plurality of the image forming apparatuses are provided, and
the printing system searches candidates according to functions provided in the image forming apparatus that is an output destination as the recommendation setting candidates.

7. The printing system as defined in claim 1, wherein
the printing system searches candidates according to a type of a document file intended to output as the recommendation setting candidates.

8. The printing system as defined in claim 1, wherein
the printing system is provided with a print history management apparatus connected to the information processing apparatus via a network, and
the print history management apparatus accumulates the print setting histories concerning a plurality of the information processing apparatuses, or concerning a user who uses any of the plurality of the information processing apparatuses.

9. The printing system as defined in claim 1, wherein
the printing system is provided with one of the information processing apparatuses, and
the information processing apparatus accumulates the print setting histories concerning a user who uses the information processing apparatus in a storage device provided inside the information processing apparatus.

10. A printing system provided with an image forming apparatus, and an information processing apparatus capable of giving a print instruction to the image forming apparatus, wherein
the printing system accumulates set contents of print setting items at time of print instruction in the information processing apparatus as a print setting history, and at start of print setting or at time of print setting change in the information processing apparatus, searches recommendation setting candidates based on a predetermined recommendation basis from the set contents of the print setting items at the start of the print setting or at the time of the print setting change, and displays the searched recommendation setting candidates on the information processing apparatus, wherein
the print setting history includes information concerning the information processing apparatus or a user of the information processing apparatus, and the printing system does not execute a display of the recommendation setting candidates regarding at least the print setting items that have been set in the information processing apparatus, in a case where the searched recommendation setting candidates have been set in past times in the print setting items in the print setting history concerning the information processing apparatus displaying the recommendation setting candidates or the user of the information processing apparatus.

11. A print setting proposal method in a printing system provided with an image forming apparatus, and an information processing apparatus capable of giving a print instruction to the image forming apparatus, including:
an accumulation step for accumulating set contents of print setting items at time of print instruction in the information processing apparatus as a print setting history; and
a step for searching recommendation setting candidates based on a predetermined recommendation basis from the set contents of print setting items at start of print setting or at time of print setting change, and displaying the searched recommendation setting candidates on the information processing apparatus, wherein
the printing system searches the recommendation setting candidates based on a recommendation basis such that a setting frequency of the set contents is greater than a predetermined order,
a plurality of the image forming apparatuses are provided,
the print setting history includes information concerning a model of the image forming apparatus, and
the printing system searches the recommendation setting candidates from the print setting histories that satisfy specific conditions concerning a difference between models of the image forming apparatuses based on the recommendation basis such that the setting frequency of the set contents is greater than the predetermined order.

12. A print setting proposal method in a printing system provided with an image forming apparatus, and an information processing apparatus capable of giving a print instruction to the image forming apparatus, including:

an accumulation step for accumulating set contents of print setting items at time of print instruction in the information processing apparatus as a print setting history; and a step for searching recommendation setting candidates based on a predetermined recommendation basis from the set contents of print setting items at start of print setting or at time of print setting change, and displaying the searched recommendation setting candidates on the information processing apparatus, wherein the print setting history includes information concerning the information processing apparatus or a user of the information processing apparatus, and the printing system does not execute a display of the recommendation setting candidates regarding at least the print setting items that have been set in the information processing apparatus, in a case where the searched recommendation setting candidates have been set in past times in the print setting items in the print setting history concerning the information processing apparatus displaying the recommendation setting candidates or the user of the information processing apparatus.

13. A print setting proposal method in a printing system provided with an image forming apparatus, and an information processing apparatus capable of giving a print instruction to the image forming apparatus, including:

an accumulation step for accumulating set contents of print setting items at time of print instruction in the information processing apparatus as a print setting history; and a step for searching recommendation setting candidates based on a predetermined recommendation basis from the set contents of print setting items at start of print setting or at time of print setting change, and displaying the searched recommendation setting candidates on the information processing apparatus, wherein the accumulation step accumulates the print setting items that have been set before in it as print setting items that have been set in past times, and does not execute a display of the recommendation setting candidates in a case where the recommendation setting candidates include the print setting items that have been set in past times, regarding at least the print setting items that have been set in past times.

* * * * *